United States Patent
Wang et al.

(10) Patent No.: US 9,256,321 B2
(45) Date of Patent: Feb. 9, 2016

(54) TOUCH DEVICE, PROCESSOR AND TOUCH SIGNAL ACCESSING METHOD THEREOF

(71) Applicant: INDUSTRIAL TECHNOLOGY RESEARCH INSTITUTE, Hsinchu (TW)

(72) Inventors: Shen-Po Wang, Taoyuan County (TW); Bo-Wen Xiao, Taoyuan County (TW); Yen-Lin Pan, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/311,817

(22) Filed: Jun. 23, 2014

(65) Prior Publication Data
US 2015/0227258 A1  Aug. 13, 2015

(30) Foreign Application Priority Data
Feb. 7, 2014 (TW) ............... 103104006 A (51) Int. Cl.
*G06F 3/041* (2006.01)
*G06F 3/044* (2006.01)
*G06F 1/32* (2006.01)

(52) U.S. Cl.
CPC ............ *G06F 3/0418* (2013.01); *G06F 1/3212* (2013.01); *G06F 3/044* (2013.01)

(58) Field of Classification Search
CPC ....... G06F 3/041; G06F 3/0414; G06F 3/046; G06F 3/047; G06F 2203/041; G06F 3/044; G06F 3/045; G06F 2203/04107; G06F 2203/04111; G06F 2203/04113; G06F 1/169; G09G 2300/0465

USPC .................................. 345/156–174
See application file for complete search history.

(56) References Cited

U.S. PATENT DOCUMENTS 6,445,384 B1 * 9/2002 Atwood .................. G06F 3/033
                                                                345/179
2006/0221061 A1 * 10/2006 Fry ............................... 345/173
(Continued)

FOREIGN PATENT DOCUMENTS

CN          101807130 A     8/2010
TW          201232357 A     8/2012
(Continued)

OTHER PUBLICATIONS

3M Touch Systems, Inc., "3M ™ Microtouch ™ Controller EX USB Reference Guide" TSD-29489, Version F, 2011.
(Continued)

*Primary Examiner* — Jason Olson
*Assistant Examiner* — Deeprose Subedi
(74) *Attorney, Agent, or Firm* — Rabin & Berdo, P.C.

(57) ABSTRACT

A touch device, a processor and a touch signal accessing method thereof are provided. The touch signal accessing method of the touch device includes the following steps. A current touch point is received. Whether a spatial continuity is smaller than a spatial threshold, and a time continuity is smaller than a time threshold are determined. If the spatial continuity is smaller than the space threshold and the time continuity is smaller than the time threshold, then the current touch point is added to a temporary touch point set and a count value is accumulated. Whether the current touch point is a significance point is determined. If the current touch point is the significance point, a touch point reporting procedure is performed.

16 Claims, 9 Drawing Sheets

(56) References Cited

U.S. PATENT DOCUMENTS

| | | | |
|---|---|---|---|
| 2006/0238531 A1* | 10/2006 | Wang | 345/211 |
| 2007/0152976 A1* | 7/2007 | Townsend et al. | 345/173 |
| 2009/0284491 A1 | 11/2009 | Chen et al. | |
| 2010/0073318 A1 | 3/2010 | Hu et al. | |
| 2010/0156819 A1 | 6/2010 | Takahashi et al. | |
| 2010/0271319 A1 | 10/2010 | Goo et al. | |
| 2011/0221701 A1 | 9/2011 | Zhang et al. | |
| 2012/0044151 A1 | 2/2012 | Wilson et al. | |
| 2012/0194444 A1* | 8/2012 | Chang | G06F 3/048883 345/173 |
| 2012/0268417 A1 | 10/2012 | Mo | |
| 2012/0306803 A1 | 12/2012 | Kuo | |
| 2013/0176233 A1 | 7/2013 | LIN et al. | |
| 2013/0222340 A1* | 8/2013 | Ito | G06F 3/044 345/174 |

FOREIGN PATENT DOCUMENTS

| | | | |
|---|---|---|---|
| TW | 201316206 A | 4/2013 | |
| TW | 1403948 B | 8/2013 | |

OTHER PUBLICATIONS

Roy G. Gordon, "Criteria for Choosing Transparent Conductors" MRS Bulletin, vol. 25, Issue 8, pp. 52-57, Aug. 2000.

N. Kikuchi et al., "Electrical and mechanical properties of $SnO_2$:Nb films for touch screens" Vacuum 66, pp. 365-371, Aug. 2002.

Gary Barrett et al., "Projected-Capacitive Touch Technology" Information Display 3/10, pp. 16-21, 2010.

Tzu-Hsuan Tsai et al., "Organic Acid Mixing to Improve ITO Film Etching in Flat Panel Display Manufacturing" Journal of the Electrochemical Society, 153, C86-C90, Dec. 2005.

S.H. Mohamed et al., "Properties of Indium Tin Oxide Thin Films Deposited on Polymer Substrates" ACTA Physica Polonica A, vol. 115, No. 3, Oct. 2008.

Seunghoon Ko et al., "Low Noise Capacitive Sensor for Multi-touch Mobile Handset's applications" IEEE Asian Solid-State Circuits Conference, Nov. 2010.

Ki-Duk Kim et al., "A Capacitive Touch Controller Robust to Display Noise for Ultrathin Touch Screen Displays" 2012 IEEE International Solid-State Circuits Conference Digest of Technical Papers (ISSCC), pp. 116-117, Feb. 2012.

Taiwanese Office Action dated Oct. 13, 2015.

\* cited by examiner

TOUCH DEVICE, PROCESSOR AND TOUCH SIGNAL ACCESSING METHOD THEREOF

This application claims the benefit of Taiwan application Serial No. 103104006, filed Feb. 7, 2014, the subject matter of which is incorporated herein by reference.

TECHNICAL FIELD

The disclosure relates in general to a touch device, a processor and a touch signal accessing method thereof.

BACKGROUND

Touch panel has become a new information input device in recent years. The principle of touch panel is operated by touching the screen. Touch panel is conveniently carrying and human-based function operation. The touch panel can be classified into the following four types according to the induction principle: optical touch panel, acoustical touch panel, capacitive touch panel and resistive touch panel. Recently, the capacitive touch panel has shared the most market. The capacitive touch monitor is constituted by the Indium-Tin-Oxide (ITO) transparent conductive thin film. The capacitive touch monitor determines the movement of finger by the change of capacitance, and the change of capacitance is generated by the ITO electrode when the finger touches the touch panel. Before the finger touches the touch panel, the parasitic capacitance between the transparent electrodes ideally is a fixed capacitance. After the finger touches the touch panel, the finger or the conductive object forms a loop to change the parasitic capacitance between the original transparent electrodes. Thus, while the changing amount of the capacitance can be detected, whether the finger or the conductive object touches the surface of the touch panel can also be determined.

The foldable capacitive touch panel can be disturbed by the condition, such as ambient temperature or humidity. Another obvious noise generated source is the electric signal of the display. Therefore, we have to realize the features of interferences and noises of the touch panel.

For example, using the digital filter can achieve the purpose of decreasing noises. The digital filter uses the charge transfer method to sense the change of capacitance of the touch panel. The charge transfer method contains the effect of resisting the high frequency noise. It is because that the average amplitude of noises is 0. If the charge accumulation cycle is longer, the accumulated amplitude of noises will approach to 0.

However, the most of scanning frequencies of the display is 60 Hz. The noises of this scanning frequency are not all the high frequency noises and may not always contain the phenomenon of the accumulated amplitude of noise approaching to 0. Thus, it may hardly to filter all the noises by the existing IC. This may generate the large amount of false reporting point.

In another aspect, the present technology also provides the method to eliminate the impact of noises by using the differential sensing circuit. The principle of the differential sensing method is that because of the two adjacent sensing electrodes of touch panel will respectively receive the similar amplitude of noises. As such, subtracting the two sensing signals of the two adjacent sensing electrodes will the impact of the noises.

However, the capacitance of the sensing electrodes may be different due to the variance of manufacturing processes. When the finger doesn't touch the touch panel, the capacitance values of the two sensing electrodes are similar and the impacts of noises are also similar. When the finger touches the touch panel, the capacitance values of the two adjacent sensing electrodes are different. But, the impacts of noises are still similar. Thus, by subtracting the two sensing signals of the two adjacent sensing electrodes, it will eliminate the impact of the noises. Besides, only the change of current value caused by the finger will be enhanced by the charge amplifier. Also, the change of current value caused by the finger will be transferred to a voltage signal and then output the voltage signal. However, it is hard to use this method to deal with the signal generated by non-locality stray.

SUMMARY

The disclosure is related to a touch device, a processor and a touch signal accessing method thereof. The disclosure uses the spacing distance and time interval between the current touch point and the previous touch point of the current touch point to determine whether the current touch point is reported falsely. By this way, the disclosure solves the problem about the phenomenon of electric magnetic interference and noises of the capacitive touch film when the panel is driven.

According to an aspect of the disclosure, a touch signal accessing method is provided. The touch signal accessing method of the touch device includes the following steps. A current touch point is received. Whether a spatial continuity is smaller than a spatial threshold, and a time continuity is smaller than a time threshold are determined. If the spatial continuity is smaller than the space threshold and the time continuity is smaller than the time threshold, then the current touch point is added to a temporary touch point set and a count value is accumulated. Whether the current touch point is a significance point is determined. If the current touch point is the significance point, a touch point reporting procedure is performed.

According to another aspect the disclosure, a touch panel device including a touch panel, an accessing unit, a processor and an output unit is provided. The accessing unit receives a current touch point of the touch panel and receives a previous touch point received before the current touch of the touch panel. The processor including a logic determining unit, and a computing unit is provided. The logic determining unit determines whether a spatial continuity is smaller than a spatial threshold, and a time continuity is smaller than a time threshold. The computing unit adds the current touch point to a temporary touch point set and accumulates a count value when the spatial continuity is smaller than the spatial threshold, and the time continuity is smaller than the time threshold. And, the logic determining unit further determines whether the current touch point is a significance point according to the count value. The output unit performs a touch point reporting procedure if the current touch point is the significance point.

According to another aspect the disclosure, a processor is provided. The processor coupled to an accessing unit and an output unit. The accessing unit receives a current touch point of the touch panel and receives a previous touch point received before the current touch of the touch panel. The processor including a logic determining unit and a computing unit is provided. The logic determining unit determines whether a spatial continuity is smaller than a spatial threshold, and a time continuity is smaller than a time threshold. The computing unit adds the current touch point to a temporary touch point set and accumulates a count value when the spatial continuity is smaller than the spatial threshold, and the time continuity is smaller than the time threshold. Wherein the logic determining unit further determines whether the current touch point is a significance point according to the count value, and the output unit performs a touch point reporting procedure if the current touch point is the significance point.

The above and other aspects of the disclosure will become better understood with regard to the following detailed description of the preferred but non-limiting embodiments. The following description is made with reference to the accompanying drawings.

DETAILED DESCRIPTION

First Embodiment

Figure 1:
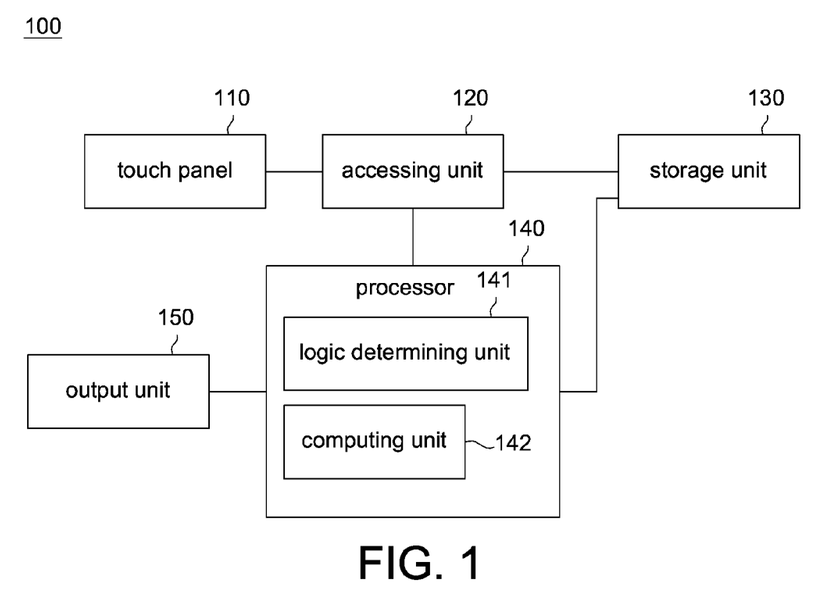
FIG. 1 is a block diagram of a touch device 100 according to a first embodiment.

Please referring to FIG. 1, FIG. 1 is a block diagram of a touch device 100 according to a first embodiment. The touch device 100 comprises a touch panel 110, an accessing unit 120, a storage unit 130, a processor 140 and an output unit 150. The touch device 100 can be any kinds of electronic device with touching technology, e.g. a smart phone or a tablet The touch panel 110 receives a touch signal from user. For example, the touch panel 110 can be a capacitive touch panel or a resistive touch panel. The accessing unit 120 is used for receiving the touch signal of the touch panel 110. For example, the accessing unit 120 can be a trace on the circuit board or signal cables. The storage unit 130 is used for storing information. The storage unit 130 can be a memory, a disk, or a memory card, etc., which can be used for storing information, and the storage unit 130 even can be a remote connection device. The processor 140 comprises a logic determining unit 141 and a computing unit 142. The processor 140 is used for performing the kinds of the calculations and controlling processes. For instance, the processor 140 can be a micro chip, a firmware circuitry or a storage media which stores a plurality of program codes. The logic determining unit 141 is used for processing many kinds of logic determining calculation. The computing unit 142 is used for computing many kinds of data. The output unit 150 is used for outputting the result computed by the processor 140. For example, the output unit 150 can be a signal trace or a display panel.

Figure 2:
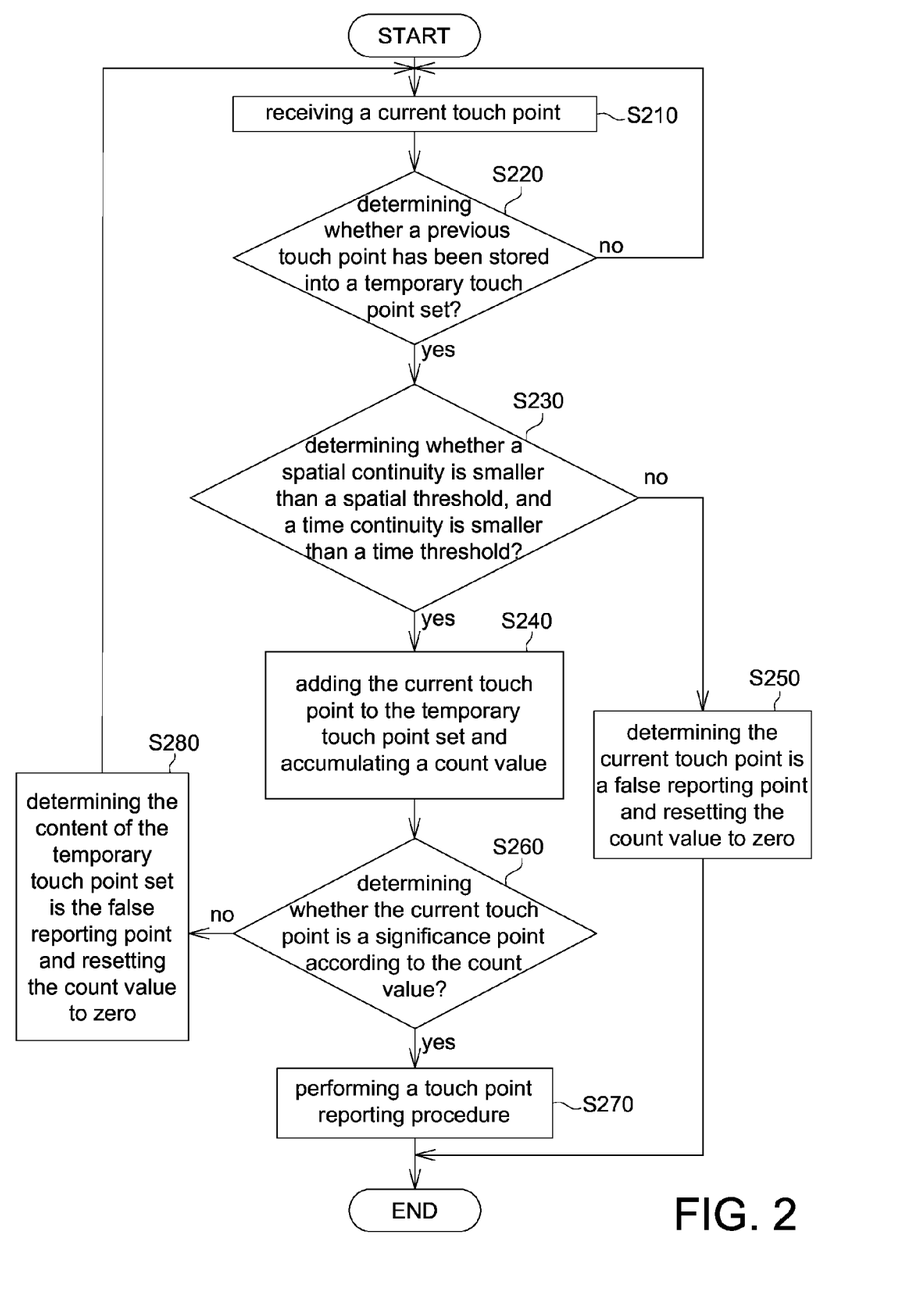
FIG. 2 is a flowchart of a touch signal accessing method according to the first embodiment.

Please referred to FIG. 2, FIG. 2 is a flowchart of a touch signal accessing method according to the first embodiment. The operations between above components and the touch signal accessing method of the embodiment will become better understood with regard to the following detailed flow-chart diagram. However, the skilled person should understand that the touch panel controlling method in this embodiment is not limited to be applied to the touch device 100 shown in FIG. 1 and is not limited by the sequence of steps shown on the flowchart diagram. Besides, the touch signal accessing method of FIG. 2 can be implemented by a program. And, the program can be loaded into a computer program product. For instance, the computer program product can be a micro chip, a firmware circuit, a storage medium, or a laptop, which can store the computer program.

Figure 3A:
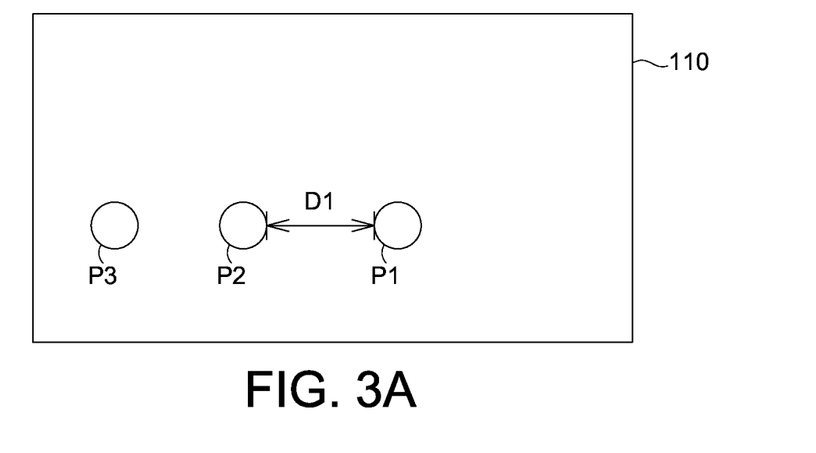
FIG. 3A to 3B are schematic diagrams of the touch signal accessing method according to the first embodiment.
Figure 3B:
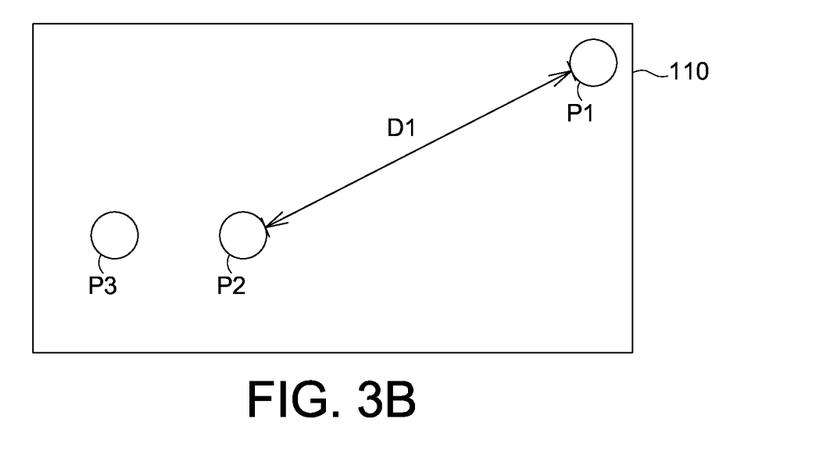

Firstly, referring to FIGS. 3A to 3B, FIGS. 3A to 3B are schematic diagrams of the touch signal accessing method according to the first embodiment. In step S210, the accessing unit 120 receives the current touch point P1 of the touch panel 110.

Next, in step S220, the processor 140 determines that whether a previous touch point P2 has been stored into a temporary touch point set. If the temporary touch point set has already stored a previous touch point P2, the step S230 is performed. If the temporary touch point set has not already stored a previous touch point P2, then go back to step S210.

In step S230, as shown in FIGS. 3A and 3B, the logic determining unit 141 determines whether a spatial continuity is smaller than a spatial threshold, and a time continuity is smaller than a time threshold.

Wherein, the spatial continuity is a spacing distance between the previous touch point P2 and the current touch point P1. The time continuity is a time interval between receiving the previous touch point P2 and the current touch point P1, or the time continuity is the number of touch points received by the accessing unit 120 and accumulated in a specified time.

For example, in FIG. 3A, the logic determining unit 141 determines whether the spacing distance D1 between the previous touch point P2 and the current touch point P1 is smaller than a spatial threshold, and the time interval between the previous touch point P2 and the current touch point P1 is smaller than a time threshold. For example, the spatial threshold is 20 pixels or the width of a finger and the time threshold is 3 unit times. If the logic determining unit 141 determines the spacing distance D1 between the previous touch point P2 and the current touch point P1 is smaller than the spatial threshold, and the time interval between the previous touch point P2 and the current touch point P1 is smaller than the time threshold, the process proceeds to step S240. In contrast, as shown in FIG. 3B, if the logic determining unit 141 determines the spacing distance D1 between the previous touch point P2 and the current touch point P1 is not smaller than the spatial threshold, or the time interval between the previous touch point P2 and the current touch point P1 is not smaller than the time threshold, the process proceeds to the step S250.

In step S250, the processor 140 determines the current touch point P1 is a false reporting point and resets a count value to zero.

Due to the noises have the features of scattered showing on the specific region or scattered showing in the different times and the users often operate the touch panel 110 by continuous sliding way, the time and the distance between the touch points have stronger regulation than the noises. The steps mentioned above are using these features of the signal to filter a part of noises.

In step S240, the calculating unit 142 adds the current touch point P1 to the temporary touch point set and accumulates the count value. Therefore, the temporary touch point set has stored the previous P2 and the current touch point P1.

For example, as shown in FIG. 3A, these touch points P1 to P3 show up according to the chronological order from left side to right side. It means that the touch panel 110 receives the touch point P3 at first and then receives the previous touch point P2. Assuming the temporary touch point set has already stored these two touch points P2, P3 and the count value is 2. Next, if it is determined that the current touch point P1 and the previous touch point P2 meet the conditions of step S230, then the current touch point P1 is added to the temporary touch point set and the count value is added to be 3 in step S240. Therefore, in the step, the count value is the number of the touch points stored in the temporary touch point set. Next, the step S260 is performed.

In step S260, the logic determining unit 141 determines whether the current touch point is a significance point according to the count value. The logic determining unit 141 can use the method of determining whether the count value larger than a point threshold to determine whether the current touch point is the significance point. If the count value is larger than the point threshold, then it is determined that the current touch point is the significance point.

For example, if the point threshold is 8 and when the accumulated count value is larger than 8, it means the temporary touch point set has stored more than 8 touch points. Thus, the logic determining unit 141 determines that the count value is larger than the point threshold and the step S270 is performed. On the contrary, if the count value is not larger than the point threshold and the step S280 is performed.

In step S270, since the logic determining unit 141 determines the current touch panel is the significance point, it means that these touch points stored in the temporary touch point set may be the touch signal generated by the user sliding on the touch panel 110, not the noises signal scattered showing on the specific region. Therefore, the output unit 150 performs a touch point reporting procedure. Besides, it can be selectively choose whether to clean the temporary touch point set according to the actual applied condition after step S270.

Besides, in step S280, when the logic determining unit 141 determines that the current touch point is not the significance point, the logic determining unit 141 determines that the content of the temporary touch point set is a false reporting point and resets the count value to zero. Next, the method goes back to the step S210 to receive the next touch point. By the steps above described, it keeps determining whether the received next touch point is noise signal. By this way, only when the significance points accumulate to reach a specific amount, the output unit performs a touch point reporting procedure to decrease the situation of reporting the false point.

By the steps described above, the touch panel 110 can use the predetermined time threshold and spatial threshold to determine whether the spacing distance and the time interval between the received current touch point and the previous touch point are close. If the spacing distance or the time interval between the received current touch point and the previous touch point has the greater difference, it means that the current touch point may have higher possibility to be the noise and determines the current touch point as the false reporting point. If the spacing distance and the time interval between the received current touch point and the previous touch point have the smaller differences, it may use the method above mentioned to further determine whether the touch point accumulated in temporary touch point set is significance point. If the touch point accumulated in temporary touch point set is not significance point, it can not be determined that the touch point is caused by user clearly sliding or selecting operation on the touch panel. Thus, it is determined that the current touch point is a false reporting point and the count value is reset to zero. As such, it can achieve filtering the noise signal received by the touch panel according to these steps.

Second Embodiment

Figure 4:
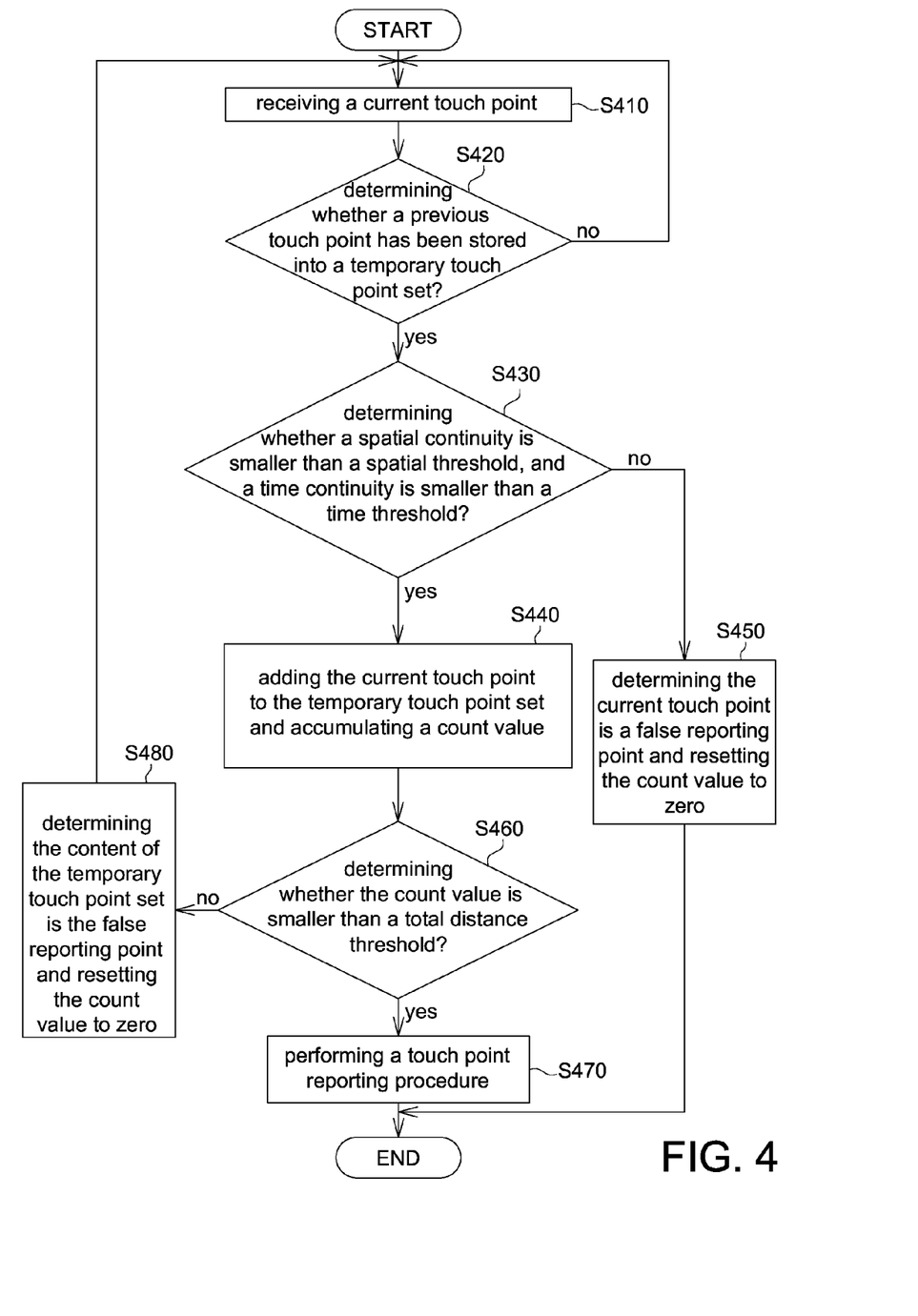
FIG. 4 is a flow chart of a touch signal accessing method according to the second embodiment.

Please referring to FIG. 4, FIG. 4 is flow chart of a touch signal accessing method according to the second embodiment. The difference between the touch signal accessing method of this embodiment and the first embodiment is in step S440 and step S460. In step S440, the computing unit 142 adds the current touch point P1 to the temporary touch point set and accumulates a count value. The count value is generated by accumulating the deviation distance between the previous touch point P2 and the current touch point P1. In step S460, the logic determining unit 141 is further used for determining whether the count value is smaller than a total distance threshold. Besides, steps S410 to S430, S450, and S470 to S480 are the same as steps S210 to S230, S250 and S270 to S280 in the first embodiment. And, detailed descriptions thereof will be omitted.

Figure 5:
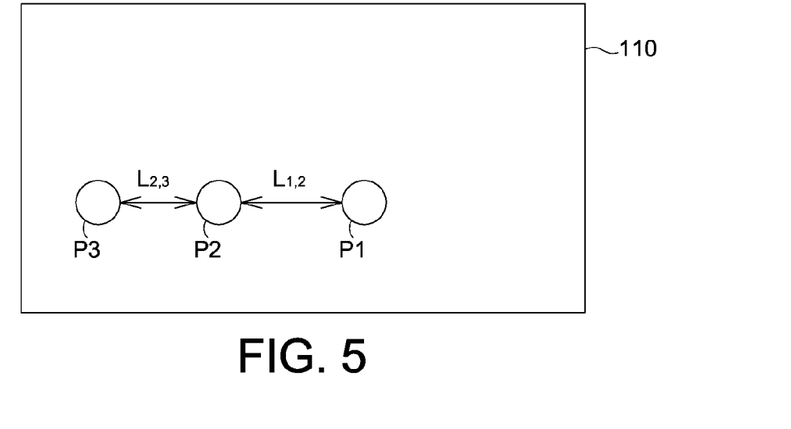
FIG. 5 is a schematic diagram of the touch signal accessing method according to a second embodiment.

For example, as shown in FIG. 4, after the touch panel signal accessing meter proceeds to the step S440, the computing unit 142 adds the current touch point P1 to the temporary touch point set and accumulates a spacing distance between the previous touch point P2 and the current touch point P1 to generate the count value. Wherein, the temporary touch point set has stored the previous touch point P2 and the current touch point P1. In step S460, the logic determining unit 141 is further used for determining whether the count value is smaller than a total distance threshold. If the count value is smaller than the total distance threshold, it is determined that the current touch point P1 is the significance point. Else, the current touch point P1 is determined as the false reporting point. And, the count value is reset to zero Besides, please refer to FIG. 5, FIG. 5 is a schematic diagram of the touch signal accessing method according to a second embodiment. In FIG. 5, the touch point P1 is the current touch point, the touch point P2 is the previous touch point. And, the received time of the touch point P3 is earlier than the received time of the previous touch point P2. If the spacing distance $L_{2,3}$ has been obtained, then the spacing distance $L_{1,2}$ between the current touch point P1 and the previous touch point P2 is added to the spacing distance $L_{2,3}$ between the touch point P2 and the touch point P3 in step S440. Therefore, the accumulated spacing distance is as the count value. In another embodiment, the computing unit 142 generates the count value by accumulating the deviation distance between the previous touch point P2 and the predicted position of a predicted touch point (e.g. the touch point P1' shown in FIG. 7) to generate the count value. Also, the logic determining unit 141 is further used for determining whether the count value is smaller than a total distance threshold. If the count value is smaller than the total distance threshold, it is determined that the current touch point P1 is the significance point. Else, the current touch point P1 is determined as the false reporting point. And, the count value is reset to zero Because of the noise signals has the feature of shorter trace length, the noise signals have longer accumulated spacing distance can further be filtered by the above processes.

Third Embodiment

Figure 6:
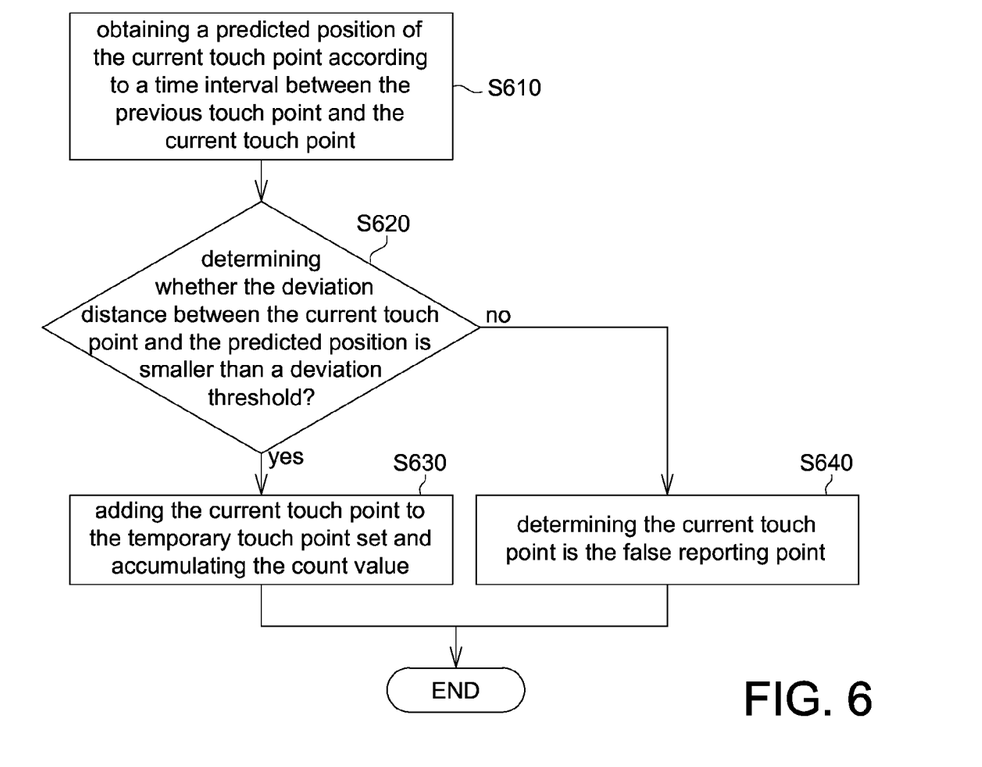
FIG. 6 is a flow chart of a touch signal accessing method according to the third embodiment.

Please refer to FIG. 6, FIG. 6 is a flow chart of a touch signal accessing method according to the third embodiment. In present embodiment, the method can use the following steps to predict the predicted position of current touch point and to determine whether the current touch point is the false reporting point.

Figure 7A:
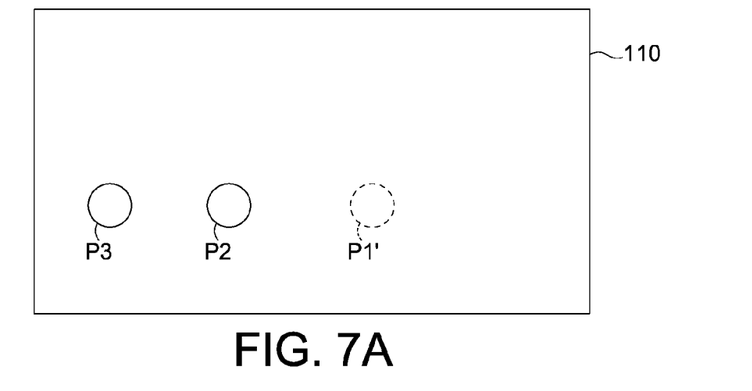
FIG. 7A to 7C are a schematic diagram of a touch panel controlling method according to a third embodiment.
Figure 7B:
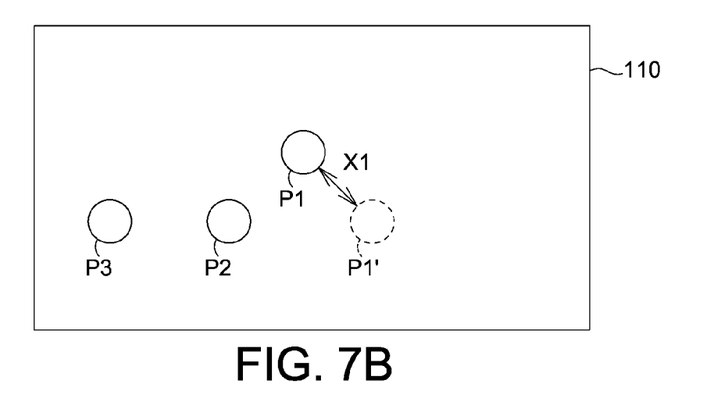
Figure 7C:
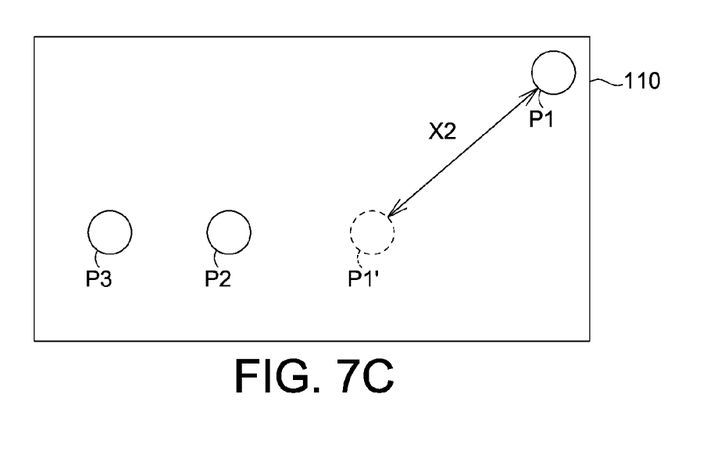

In step S610, please also refer to FIGS. 7A to 7C, FIGS. 7A to 7C are a schematic diagram of a touch panel controlling method according to a third embodiment. In FIG. 7A, the computing unit 142 obtains a predicted position P1' of the current touch point P1 according to a time interval between a previous touch point P2 and the current touch point P1. Wherein, the prediction method performs the calculation and estimation according to the position of the previous touch point P2, or the distance and/or the received time between the current touch point P1 and the previous touch point P2 by using the method of a linear regression, a non-linear regression, a linear interpolation points, a non-linear interpolation points, a mathematical morphology, or a machine learning algorithm, etc. . . . These algorithms are easily to be obtained from the internet by the person skilled in the art. Thus, the detailed descriptions thereof will be omitted. Accordingly, in present embodiment, the computation method of spatial continuity can be computed according to the received time interval between the current touch point P1 and the previous touch point P2 to obtain the predicted position P1' of the current touch point. And then, the spatial continuity can be generated by obtaining a deviation distance X1 between the current touch point P1 and the predicted position P1'.

Next, in step S620, the logic determining unit 141 determines whether the deviation distance between the current touch point P1 and the predicted position P1' is smaller than a deviation threshold. As shown in FIG. 7B, if the logic determining unit 141 determines the deviation distance X1 between the current touch point P1 and the predicted position P1' is smaller than a deviation threshold, step S630 is performed. In contrast, as shown in FIG. 7C, in another embodiment, if the logic determining unit 141 determines the deviation distance X1 between the current touch point P1 and the predicted position P1' is not smaller than the deviation threshold, step S640 is performed.

In step S630, the computing unit 142 adds the current touch point P1 to the temporary touch point set and accumulates the count value. The current touch point P1 is determined as the significance point. In present embodiment, the count value can be determined by accumulating the deviation distance of the current touch point P1 and the predicted position P1'.

In step S640, the processor 140 determining the current touch point is the false reporting point.

Although the embodiments divided into the first embodiment to the third embodiment as example to explain. The first embodiment and the third embodiment can combine to operate on the same touch device 100. And, the second embodiment and the third embodiment can combine to operate on the same touch device 100. When the touch panel 110 receives the plurality touch points, the touch device 100 can use the combination of the first embodiment and the third embodiment. For example, when the step S260 in the first embodiment is finished, then the steps S610-S640 in the third embodiment are performed. By the relationship of spatial and time between the touch points and by the predicted position of current touch point, the touch device 100 can determine whether the current touch point is a false reporting point. Further, the combination of the first embodiment and the second embodiment can be used under the condition that the touch device 100 is available loaded. This can further determine whether the accumulated length of received touch points is larger than the length threshold to increase the accuracy of determining whether the current touch point is the false reporting point. Besides, the disclosure can be use for the ultra-thin baseboard display to reach quite obvious effect of resisting the noise interference. However, the content of the disclosure is not limited to the foldable touch panel.

Therefore, the disclosure uses the feature of the significance point and the false reporting point, the spatial relationship and the time relationship between and the current touch point and the previous touch point, and supported by the length and the count value accumulated in temporary touch point set, to effectively reduce the situation of false reporting point. As such, the disclosure does not need to use the extra filtering noise signal algorithm.

Besides, the disclosure can achieve precisely reducing noise signal interference and effectively keep the operation of the user.

Fourth Embodiment

Figure 8:
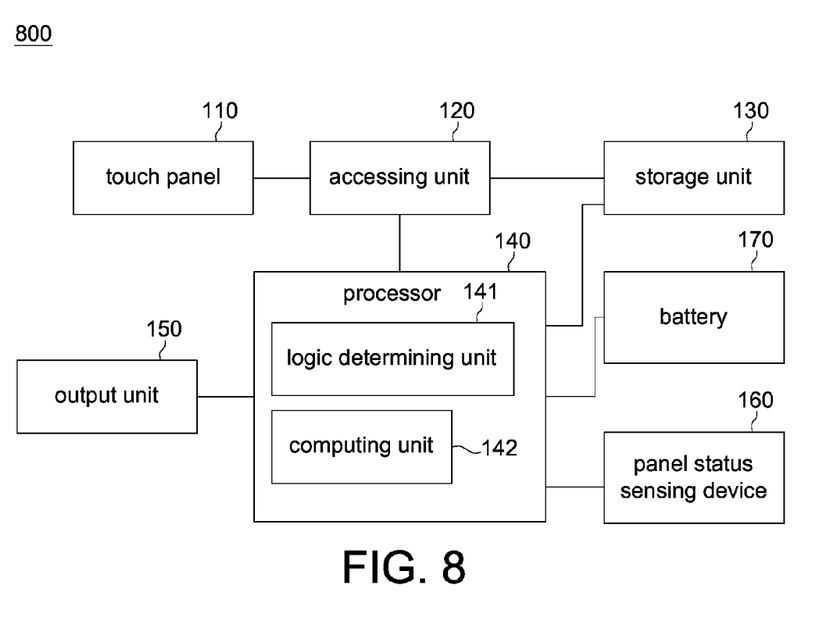
FIG. 8 is a block diagram of a touch device 800 according to a fourth embodiment.

Please referring to FIG. 8, FIG. 8 is a block diagram of a touch device 800 according to a fourth embodiment. The difference between the touch device 100 of the first embodiment and the touch device 800 of this embodiment is in that the touch device 800 of this embodiment further includes a panel status sensing device 160 and a battery 170. The battery 170 is used for supplying power to the touch device 800. The panel status sensing device 160 is used for sensing a panel status and a panel driving parameter. For example, the panel status of the touch panel 100 can be the surface temperature, humidity, and/or pressure, etc., The panel driving parameter can be the voltage, brightness, and the capacitance of battery 170.

Figure 9:
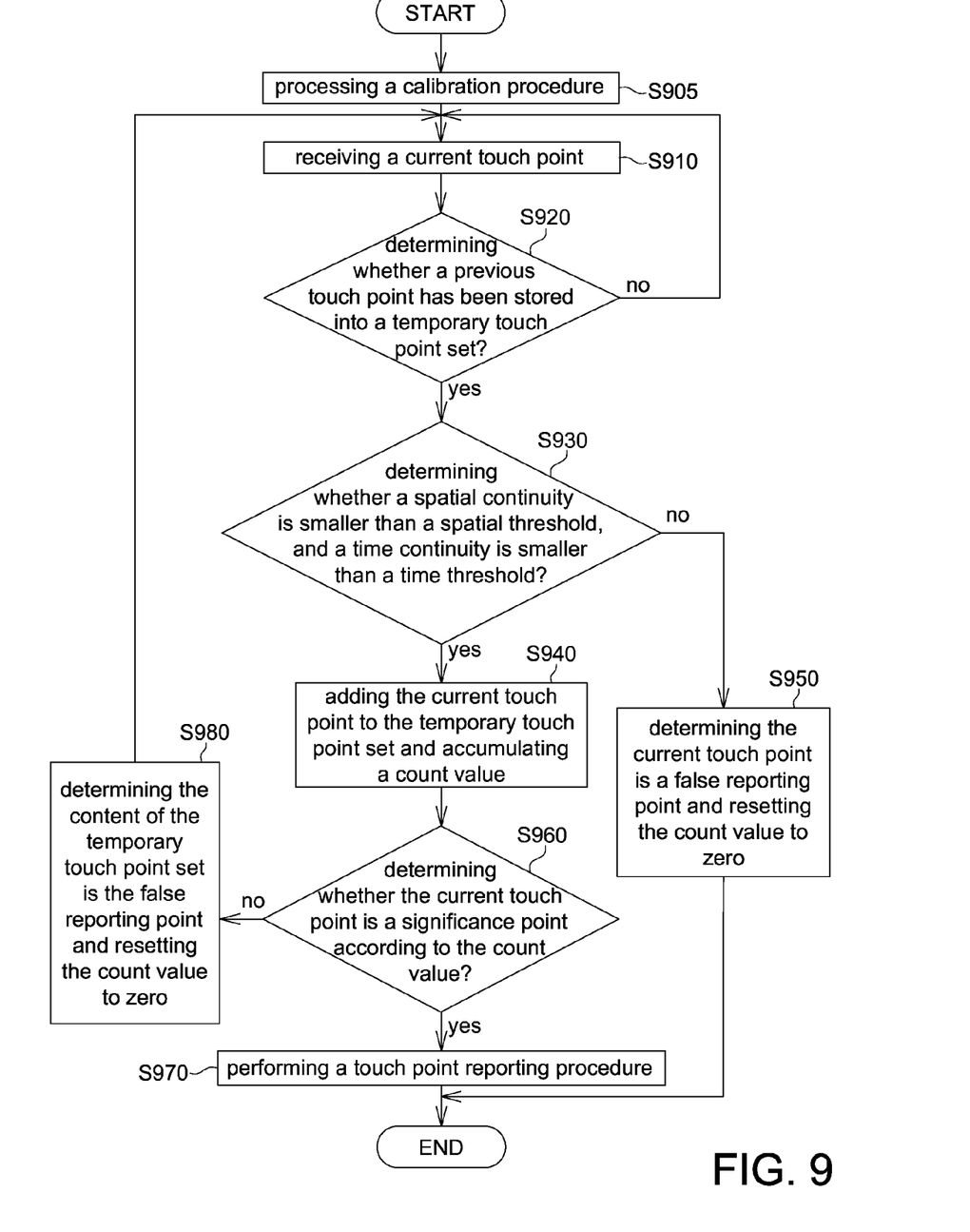
FIG. 9 is a flow chart of a touch signal accessing method according to the fourth embodiment.
Figure 10:
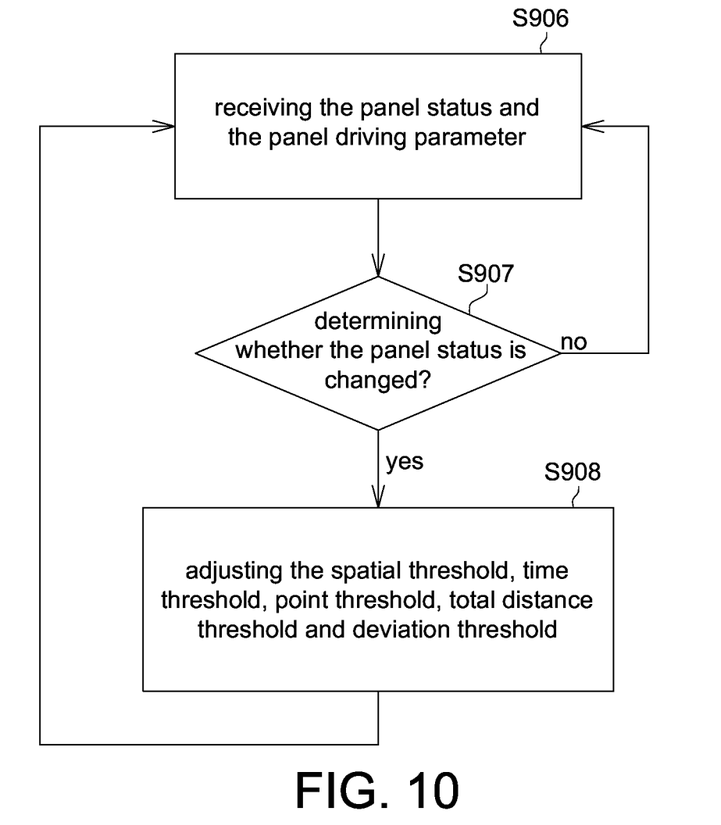
FIG. 10 is a flow chart of a calibration procedure according to the fourth embodiment.

Next, please refer to FIGS. 9 to 10, FIG. 9 is a flow chart of a touch signal accessing method according to the fourth embodiment, and FIG. 10 is a flow chart of a calibration procedure according to the fourth embodiment. The difference between the touch signal accessing method of this embodiment and the first embodiment is before the step of receiving a current touch point, the present embodiment further performs step S905 to process a calibration procedure. For example, when the panel status sensing device 160 senses the capacitance of battery 170 is lower than a power threshold, this presents that the battery 170 does not supply enough power to the touch panel 110. It may cause that touch panel 110 receives touch signal is less sensitive or cause the situation of receiving the hop points. For example, when user inputs a continuous trace of touch point signal, the touch panel 110 receives the non-continuous signal trace due to the touch panel 110 is less sensitive. In this situation, the panel status sensing device 160 can transmit the sensed panel status and the panel driving parameter to the processor 140. In step S906 of FIG. 10, the processor 140 receives the panel status and the panel driving parameter. Next, in step S907, the processor 140 determines that whether the panel status is changed. If the panel status is changed, step S908 is performed. In step S908, the processor 140 adjusts the spatial threshold, time threshold, point threshold, total distance threshold and deviation threshold. If the panel status is not changed, step S906 is performed. Therefore, the processor 140 can perform the calibration of the brightness of the touch panel 110. By turning down the brightness, the power consumption can be reduced. As such, the remaining power can stably supply the whole touch panel 110 to avoid the situation of the touch panel receiving the touch signal insensitively. Besides, the processor 140 can use for adjusting the spatial threshold and time threshold to improve the success rate of signal recognition. Besides, steps S910 to S980, in the present embodiment are the same as steps S210 to S280 in the first embodiment. Thus, detailed descriptions thereof will be omitted.

As such, the panel status sensing device 160 can use for sensing the panel status and the panel driving parameter. By the procedures above mentioned, the disclosure can further use the information sensed by the panel status sensing device 160 to calibrate the touch panel 110.

Besides, the calibration procedure is performed by adjusting the spatial threshold, the time threshold, the point threshold, the total distance threshold and the deviation threshold. Wherein, the panel status can be the bending status, temperature, humidity, pressure, deterioration, thickness of touch film, stray capacitance or the abnormal condition of circuits (e.g. broken circuit, short circuit, bad contact, etc.). The panel driving parameter can comprise the voltage of the touch panel, current of the touch panel, pulse of the touch panel, frequency of the touch panel, accessing rate of the touch panel, the voltage of the display panel, current of the display panel, pulse of the display panel, frequency of the display panel, etc.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch signal accessing method, comprising the steps of:
    receiving a current touch point;
    determining whether a spatial continuity is smaller than a spatial threshold, the spatial continuity being a spacing distance between a previous touch point and the current touch point;
    determining whether a time continuity is smaller than a time threshold, the time continuity being a time interval between the previous touch point and the current touch point, and if the spatial continuity is smaller than the spatial threshold, and the time continuity is smaller than the time threshold, adding the current touch point to a temporary touch point set and accumulating a count value;
    determining whether the current touch point is a significance point according to the count value; and
    performing a touch point reporting procedure if the current touch point is the significance point.

2. The touch signal accessing method according to claim 1, wherein the step of determining whether the spatial continuity is smaller than the spatial threshold comprises:
    obtaining a predicted position of the current touch point according to a time interval between a previous touch point and the current touch point, and
    obtaining a deviation distance between the current touch point and the predicted position;
    wherein the step of accumulating the count value comprises accumulating the deviation distance between the current touch point and the predicted position to generate the count value; and
    wherein the step of determining whether the current touch point is the significance point according to the count value comprises:
    determining whether the count value is smaller than a deviation threshold, and
    if the count value is smaller than the deviation threshold, determining that the current touch point is the significance point.

3. The touch signal accessing method according to claim 1, wherein the step of accumulating the count value further comprises accumulating a number of touch points stored in the temporary touch point set to generate the count value;
    wherein the step of determining whether the current touch point is the significance point according to the count value further comprises:
    determining whether the count value is larger than a point threshold, and
    if the count value is larger than the point threshold, determining that the current touch point is the significance point.

4. The touch signal accessing method according to claim 1, wherein the step of accumulating the count value further comprises accumulating a spacing distance between a previous touch point and the current touch point to generate the count value; and
    wherein the step of determining whether the current touch point is the significance point according to the count value further comprises:
    determining whether the count value is smaller than a total distance threshold; and
    if the count value is smaller than the total distance threshold, determining that the current touch point is the significance point.

5. The touch signal accessing method according to claim 1, wherein the step of determining whether the current touch point is the significance point according to the count value further comprises determining that the current touch point is a false reporting point and resetting the count value to zero, if the current touch point is not the significance point.

6. The touch signal accessing method according to claim 2, wherein the predicted position is obtained by using a linear regression, a non-linear regression, linear interpolation points, non-linear interpolation points, a mathematical morphology, or a machine learning algorithm.

7. The touch signal accessing method according to claim 1, further comprising
    performing a calibration procedure according to a panel status and a panel driving parameter before said step of receiving the current touch point.

8. The touch signal accessing method according to claim 7, wherein the calibration procedure is performed by adjusting the spatial threshold, the time threshold, the point threshold, the total distance threshold and the deviation threshold.

9. A touch panel device, comprising:
    a touch panel;
    an accessing unit, receiving a current touch point of the touch panel and receiving a previous touch point received before the current touch of the touch panel;
    a processor, comprising
        a logic determining unit, determining whether a spatial continuity is smaller than a spatial threshold and whether a time continuity is smaller than a time threshold, the spatial continuity being a spacing distance between the previous touch point and the current touch point, the time continuity being a time interval between the previous touch point and the current touch point, and
        a computing unit, adding the current touch point to a temporary touch point set and accumulating a count value when the spatial continuity is smaller than the spatial threshold and the time continuity is smaller than the time threshold; and an output unit, the logic determining unit further determines whether the current touch point is a significance point according to the count value, and the output unit performs a touch point reporting procedure if the current touch point is the significance point.

10. The touch panel device according to claim 9, wherein
the computing unit obtains a predicted position of the current touch point according to a time interval between a previous touch point and the current touch point, and then the computing unit obtains a deviation distance between the current touch point and the predicted position;
the computing unit accumulates the deviation distance between the current touch point and the predicted position to generate the count value, and the logic determining unit further determines whether the count value is smaller than a deviation threshold; and
if the count value is smaller than the deviation threshold, the logic determining unit determines that the current touch point is the significance point.

11. The touch panel device according to claim 9,
wherein the computing unit further accumulates a number of touch points stored in the temporary touch point set to generate the count value; and
the logic determining unit
further determines whether the count value is larger than a point threshold, and
determines that the current touch point is the significance point if the count value is larger than the point threshold.

12. The touch panel device according to claim 9, wherein
the computing unit accumulates a spacing distance between the previous touch point and the current touch point to generate the count value; and
the logic determining unit
further determines whether the count value is smaller than a total distance threshold, and
determines that the current touch point is the significance point if the count value is smaller than the total distance threshold.

13. The touch panel device according to claim 9, wherein when the logic determining unit determines that the current touch point is not the significance point, the logic determining unit determines that the current touch point is a false reporting point and resets the count value to zero.

14. The touch panel device according to claim 9, further comprising a panel status sensing device, sensing a panel status and a panel driving parameter, wherein the computing unit performs a calibration procedure according to the panel status and the panel driving parameter.

15. The touch panel device according to claim 14, wherein the calibration procedure is performed by adjusting the spatial threshold, the time threshold, the point threshold, the total distance threshold and the deviation threshold.

16. A processor coupled to an accessing unit and an output unit, the accessing unit for receiving a current touch point of the touch panel and receiving a previous touch point received before the current touch of the touch panel, the processor comprising:
a logic determining unit, determining whether a spatial continuity is smaller than a spatial threshold and whether a time continuity is smaller than a time threshold, the spatial continuity being a spacing distance between the previous touch point and the current touch point, the time continuity being a time interval between the previous touch point and the current touch point; and
a computing unit, adding the current touch point to a temporary touch point set and accumulating a count value, when the spatial continuity is smaller than the spatial threshold and the time continuity is smaller than the time threshold;
wherein the logic determining unit further determines whether the current touch point is a significance point according to the count value, and the output unit performs a touch point reporting procedure if the current touch point is the significance point.

* * * * *